United States Patent
Tung

(10) Patent No.: US 7,197,094 B2
(45) Date of Patent: Mar. 27, 2007

(54) SYMBOL-BASED DECISION FEEDBACK EQUALIZER (DFE) WITH MAXIMUM LIKELIHOOD SEQUENCE ESTIMATION FOR WIRELESS RECEIVERS UNDER MULTIPATH CHANNELS

(75) Inventor: Chien-Cheng Tung, Fremont, CA (US)

(73) Assignee: Ralink Technology, Inc., Cupertino, CA (US)

( * ) Notice: Subject to any disclaimer, the term of this patent is extended or adjusted under 35 U.S.C. 154(b) by 783 days.

(21) Appl. No.: 10/402,697

(22) Filed: Mar. 28, 2003

(65) Prior Publication Data

US 2003/0231722 A1    Dec. 18, 2003

Related U.S. Application Data

(60) Provisional application No. 60/390,600, filed on Jun. 18, 2002.

(51) Int. Cl.
*H04L 27/06*     (2006.01)

(52) U.S. Cl. ............. 375/341; 375/262; 375/316; 375/346; 714/794

(58) Field of Classification Search ........ 375/147, 375/148, 316, 340, 341, 130, 140, 229, 230, 375/233, 259, 260, 261, 262, 346, 348; 714/699, 714/746, 786, 794
See application file for complete search history.

(56) References Cited

U.S. PATENT DOCUMENTS

| | | | | |
|---|---|---|---|---|
| 5,142,551 A | * | 8/1992 | Borth et al. | 375/219 |
| 6,735,724 B1 | * | 5/2004 | McClellan | 714/704 |
| 2005/0280568 A1 | * | 12/2005 | Rowland et al. | 341/155 |

* cited by examiner

*Primary Examiner*—Pankaj Kumar
*Assistant Examiner*—Naheed Ejaz
(74) *Attorney, Agent, or Firm*—Maryam Imam; Law Offices of Imam

(57) ABSTRACT

A maximum likelihood sequence estimator (MLSE) sub-receiver is disclosed, in one embodiment of the present invention and includes an MLSE equalizer device responsive to input data to generate equalized data. The input data is generated from transmitted data by wireless transmission. The MLSE equalizer device processes the input data to generate residual channel response using a known codebook and the residual channel response to generate an MLSE codebook. The MLSE sub-receiver further includes an MLSE decoder responsive to the equalized data and the MLSE codebook for processing to determine maximum likelihood between the equalized data and the MLSE codebook. The MLSE decoder uses the maximum likelihood for decoding the equalized data to generate a decoded transmitted data by mitigating the effects of multi-path communication channel due to wireless transmission of the transmitted data.

17 Claims, 6 Drawing Sheets

SYMBOL-BASED DECISION FEEDBACK EQUALIZER (DFE) WITH MAXIMUM LIKELIHOOD SEQUENCE ESTIMATION FOR WIRELESS RECEIVERS UNDER MULTIPATH CHANNELS

REFERENCE TO PRIOR APPLICATION

This application claims the benefit of a previously filed U.S. Provisional Application No. 60/390,600 filed on Jun. 18, 2002, and entitled "SYMBOL-BASED DECISION FEEDBACK EQUALIZER (DFE) WITH MAXIMUM LIKELIHOOD SEQUENCE ESTIMATION FOR WIRELESS RECEIVERS UNDER MULTIPATH CHANNELS".

BACKGROUND OF THE INVENTION

1. Field of the Invention

The present invention relates generally to the field of wireless receivers and particularly to a method and apparatus for maximum likelihood sequence estimation for wireless receivers under multi-path communication channels.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11b industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11b modem receivers, however, such prior art have not successfully utilized the fullest potential of the 802.11b modem. For example, the maximum rate of this type of modem device is 11 Mbits/sec. but in the presence of multi-path, use of current prior art methods and apparatus does not allow for reception of data at such rates. In fact, successful reception of data under multi-path conditions currently takes place at rates equivalent to 5.5 Mbits/sec.

Furthermore, in areas other than open locations, such as smaller office cubicles located within the inner structure of a building, prior art receivers are known to only operate at rates lower than that of the maximum operational rate of the modem, such as 11 Mbits/sec., thus preventing a user from receiving files from another PC at optimal rates. This is generally due to the prior art techniques' limitations in operating within multi-path conditions, which occur mostly in closed areas, such as those mentioned hereinabove. Multipath effects are shown to degrade the detection of data when using prior art techniques and methods.

In light of the foregoing, it is desirable to develop a receiver for receiving 802.11b modem signals accurately and in the presence of multi-path yet at maximum rates achievable by the modem.

SUMMARY OF THE INVENTION

Briefly, an embodiment of the present invention includes a maximum likelihood sequence estimator (MLSE) sub-receiver having an MLSE equalizer device responsive to input data for processing the same to generate equalized data, said input data being generated from transmitted data by wireless transmission, said MLSE equalizer device processing said input data to generate residual channel response, said MLSE equalizer device using a known codebook and said residual channel response to generate an MLSE codebook. The MLSE sub-receiver further includes an MLSE decoder responsive to said equalized data and said MLSE codebook for processing the same to determine maximum likelihood between said equalized data and said MLSE codebook, said MLSE decoder using said maximum likelihood for decoding said equalized data to generate a decoded transmitted data by mitigating the effects of multipath communication channel due to wireless transmission of said transmitted data.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
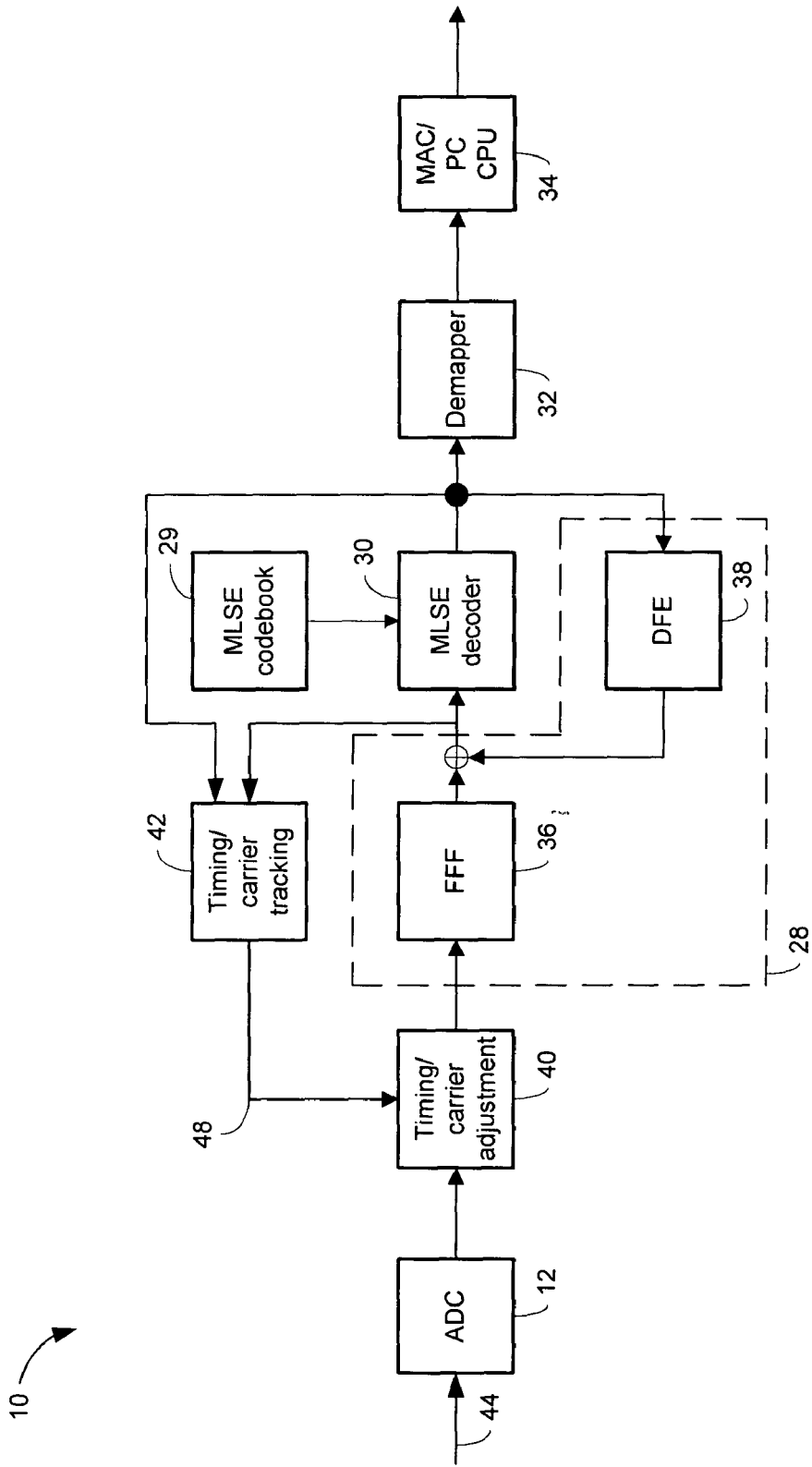
FIG. 1 shows a maximum likelihood sequence estimator (MLSE) receiver system 10 in accordance with an embodiment of the present invention.

Referring now to FIG. 1, a maximum likelihood sequence estimator (MLSE) receiver system 10 is shown to include an analog-to-digital converter (ADC) circuit 12, a timing carrier/adjustment circuit 40, a timing/carrier tracking circuit 42, an MLSE equalizer device 28, an MLSE decoder device 30, an MLSE codebook storage location 29 for storing codebooks, a demapper circuit 32 and a computer central processing unit (CPU) 34. The MLSE equalizer device 28 includes a feedforward circuit 36 and a feedback circuit 38. In one embodiment of the present invention the feedforward circuit 36 is a feedforward fractionally spaced filter (FFF) circuit and the feedback circuit 38 is a decision feedback equalizer (DFE) circuit.

An embodiment of the present invention lies generally in the MLSE decoder device 30 and the MLSE equalizer device 28 and the contents of the MLSE codebook storage location 29, collectively referred to herein as an MLSE sub-receiver. Thus, while a brief discussion will be presented in connection with the remainder of the circuits/ devices enumerated hereinabove, the operation of which is generally known to those skilled in the art, emphasis will be placed on the MLSE decoder device 30, the MLSE codebook and some portions of the MLSE equalizer device 28, i.e. the MLSE sub-receiver.

As shown in FIG. 1, the ADC circuit 12 is shown to receive a signal, a receiver signal 44, the ADC circuit 12 converts the receiver signal 44 from analog to digital form and couples the latter to the timing/carrier adjustment circuit 40. The latter additionally receives a timing/phase correction signal 48 that it uses for adjusting the timing and phase of the output of the ADC circuit 12. The operation of the timing/carrier adjustment circuit 40 and the timing/carrier tracking circuit 42 is well understood by those of ordinary skill in the art. Ultimately, the output of the timing/carrier adjustment circuit 40 is equalized by the MLSE equalizer 28, the details of which will be described in detail hereinbelow.

Further discussion of the above-mentioned circuits/devices is provided in a U.S. patent application with Ser. No. 10/402,710 entitled "SYMBOL-BASED DECISION FEEDBACK EQUALIZER (DFE) OPTIMAL EQUALIZATION METHOD AND APPARATUS WITH MAXIMUM LIKELIHOOD SEQUENCE ESTIMATION FOR WIRELESS RECEIVERS UNDER MULTIPATH CHANNELS", filed on Mar. 28, 2003, the inventors of which are Thomas Edward Pare, Chien-Cheng Tung, and Cedric Choi, the disclosure of which is herein incorporated by reference in its entirety.

The output of the MLSE equalizer device 28 is provided to the MLSE decoder 30 for decoding the output of the device 28 with the aid of the contents of the MLSE codebook storage location 29. The demapper 32 performs the function of bit mapping or data conversion wherein data is converted to actual '1's and '0's (symbol to data conversion) as in the state in which data was initially transmitted to the receiver system 10. The output of the demapper circuit 32 is provided to the Central Processing Unit of the PC or computer 34 for storage thereof or any other use by the user.

The timing/carrier tracking circuit 42 utilizes the output of the MLSE decoder device 30 and the output of the summation junction 11 to correct/adjust the timing/phase of the MLSE decoder device 30. Accordingly, the circuits 40 and 42 are continuously compensating for any phase and/or timing shifts experienced by the received signal 44 resulting from many factors, such as inaccuracies associated with the conversion of the analog format of the signal 44 to digital, phase shifts due to the wireless transfer of the signal 44 from a remotely-located transmitting device, and the like.

The circuits 40 and 42 generally are used to demodulate the received signal 44 by performing carrier and timing recovery.

While a particular type of equalizer is referred thereto in this patent document, in alternative embodiment of the present invention, any filter will work so long as a residual channel response is generated, which will be discussed further hereinbelow.

Figure 2:
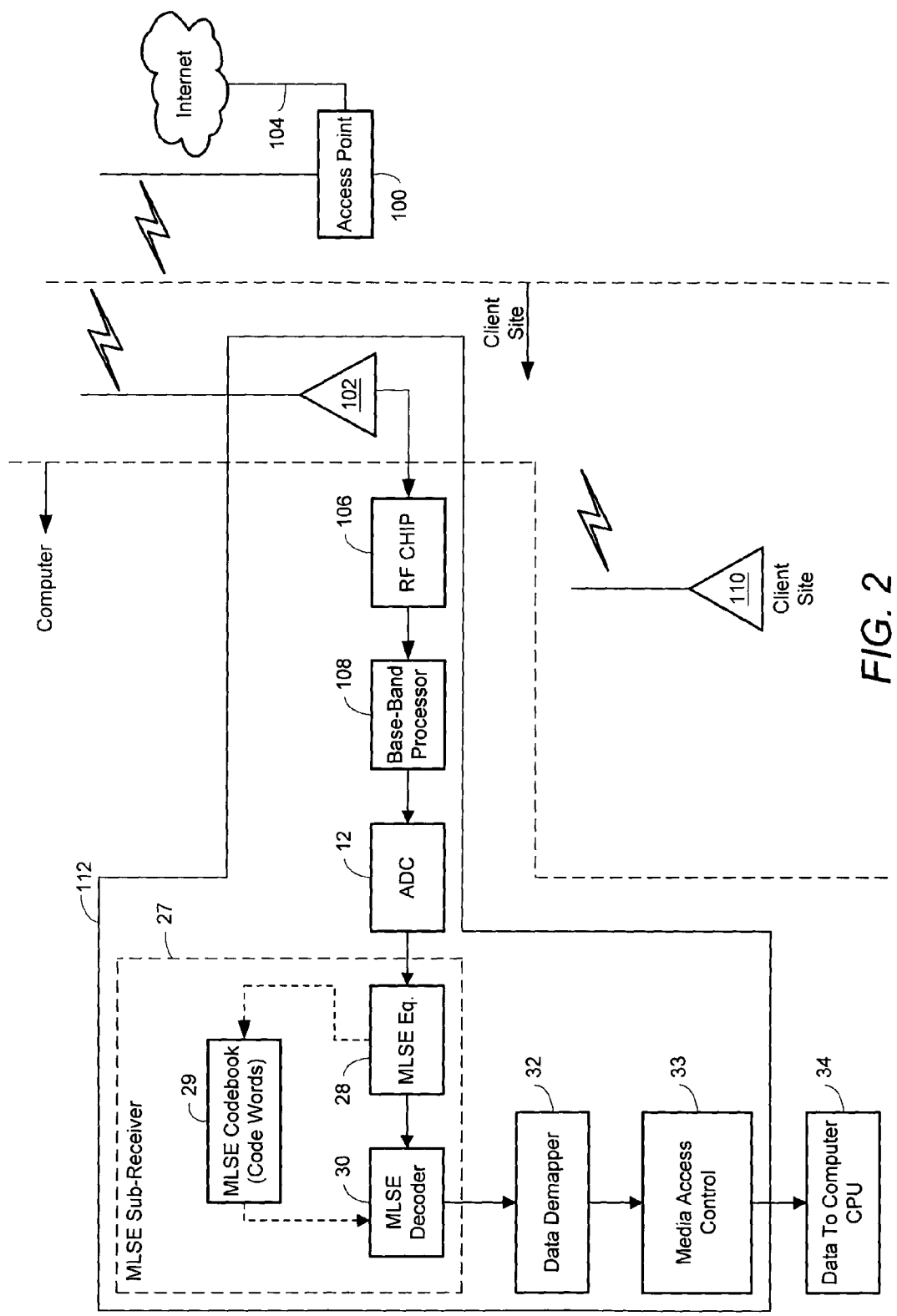
FIG. 2 shows an application of an embodiment of the present invention including further details of the embodiment of FIG. 1.

In FIG. 2, an application of an embodiment of the present invention including further details of the embodiment of FIG. 1 is shown to include an access point 100, which receives input from the Internet or local area network or the intranet, through a fast connection 104. The connection 104 may take on various known forms, such as Digital Subscriber Line (DSL), Ethernet, cable modem, etc. The access point 100 communicates with a client antenna 102. It should be noted that the devices shown to the left of the access point 100 are referred to as a part of the client site, as the client will be receiving information transmitted by the access point 100. The devices shown within the block 112 are components included with the 802.11b modem utilized for wireless networking by the embodiment of FIG. 2. The access point 100 is remotely located to the client site. An example of an access point 100 is a base station. An example of a client site is a PC. While not shown, the access point 100 includes circuits/devices similar to that shown within the block 112.

In FIG. 2, devices shown to the left of the client antenna 102 are considered either within or somehow in close proximity to a PC or computer or any communications device capable of including the same.

The client antenna 102 is connected to an Radio Frequency (RF) chip 106, the latter for receiving signals in the RF range and coupling the same onto a baseband processor device 108 for conversion of the received RF signal to baseband. Signals within the baseband range are far easier to process than at RF ranges. The baseband processor device 108 is coupled to the ADC circuit 12 for conversion of the baseband signal to digital format, as discussed relative to FIG. 1.

In FIG. 2, the output of the ADC circuit 12 is shown coupled to the input of the MLSE equalizer device 28. The device 28 and the device 30 and the MLSE codebook (or codewords) storage location 29 collectively comprise the MLSE sub-receiver 27. The codebook storage location 29 stores codewords comprising a codebook generated by the device 28 and provides these codewords to the device 30 for use thereof. It should however be noted that some circuits, as shown in FIG. 1, are intentionally absent in FIG. 2 for the sake of simplicity. Thus, the circuits shown and discussed relative to FIG. 1 that are shown between the ADC circuit 12 and the equalizer device 28 are not shown in FIG. 2.

The equalizer device 28 is shown coupled to the decoder device 30, which is coupled to the data demapper circuit 32. The output of the demapper circuit 32 is shown coupled to a media access control 33 and the latter is connected to the computer CPU 34. The functions of the demapper circuit 32 and the CPU are discussed relative to FIG. 2. The media access control 33 provides high-level functions, such as power savings, data rates, system timing, etc.

At this point, a brief discussion of the coding scheme, complementary code keying (CCK), utilized by an 802.11b is in order. Coding is basically a way of inserting redundancy into raw data (the data to be transmitted) in an effort to improve the robustness of communication. This is particularly of significance in wireless systems, such as the 802.11b although communication rate is reduced by the effects of coding.

The 802.11b utilizes quadrature phase shift keying (QPSK) as a modulation scheme for CCK coding. An uncoded QPSK carries two bits per one QPSK chip.

Generally, a symbol is also referred to as a codeword. Codewords are the ideal data sequences that are sent by the access point 100, in FIG. 2, and would be received by the receiver under perfect channel conditions. All of the possible codewords of a given data rate constitute a complementary code keying (CCK) codebook. For example, at a data rate of 11 Mbits/sec., all of the codewords of this rate make up its codebook. In the present invention, the MLSE equalizer device 28 generates the MLSE codewords or codebook for any given rate.

Eight chips of QPSK are employed by CCK coding to form a symbol at a data rate of 11 Mbits/sec. and eight chips (or eight bits) are sent per symbol at a data rate of 11 Mbits/sec., whereas, four bits per symbol are sent at a data rate of 5.5 Mbits/sec. Yet at the latter rate, while there are four bits/symbol, there are nevertheless eight chips per symbol.

Altogether, there are 256 symbols at 11 Mbits/sec. CCK data rate, whereas, there are altogether 16 symbols at 5.5 Mbits/sec. The exact code sequence of CCK is well defined in a publication by IEEE for Standard 802.11b published in 1999 as a Supplement to IEEE Standard for Information Technology—Telecommunications and Information Exchange Between Systems—Local and Metropolitan Area Networks Specific Requirements—entitled "Part 11: Wireless LAN Medium Access Conrol (MAC) and Physical Layer Extension in the 2.4 GHz Band".

CCK is a type of block coding. Assuming that the minimum square Euclidean distance (MSED) QPSK is one, the MSED at a data rate of 11 Mbits/sec. using CCK coding is four and the MSED at a data rate of 5.5 Mbits/sec. using CCK coding is eight. The MSED is generally calculated by the equation $\min_{x,y \in C, x \neq y} \|x-y\|^2$, where C is a codebook and x, y are distinct codewords. This is the minimum squared norm of any two codewords. In QPSK, there are four symbols (codewords). Assuming the labeling of the four symbols to be $\{(½, ½), (-½, ½), (-½, -½), (½, -½)\}$, then the equation yields the minimum squared Euclidean distance to be 1.

Figure 3:
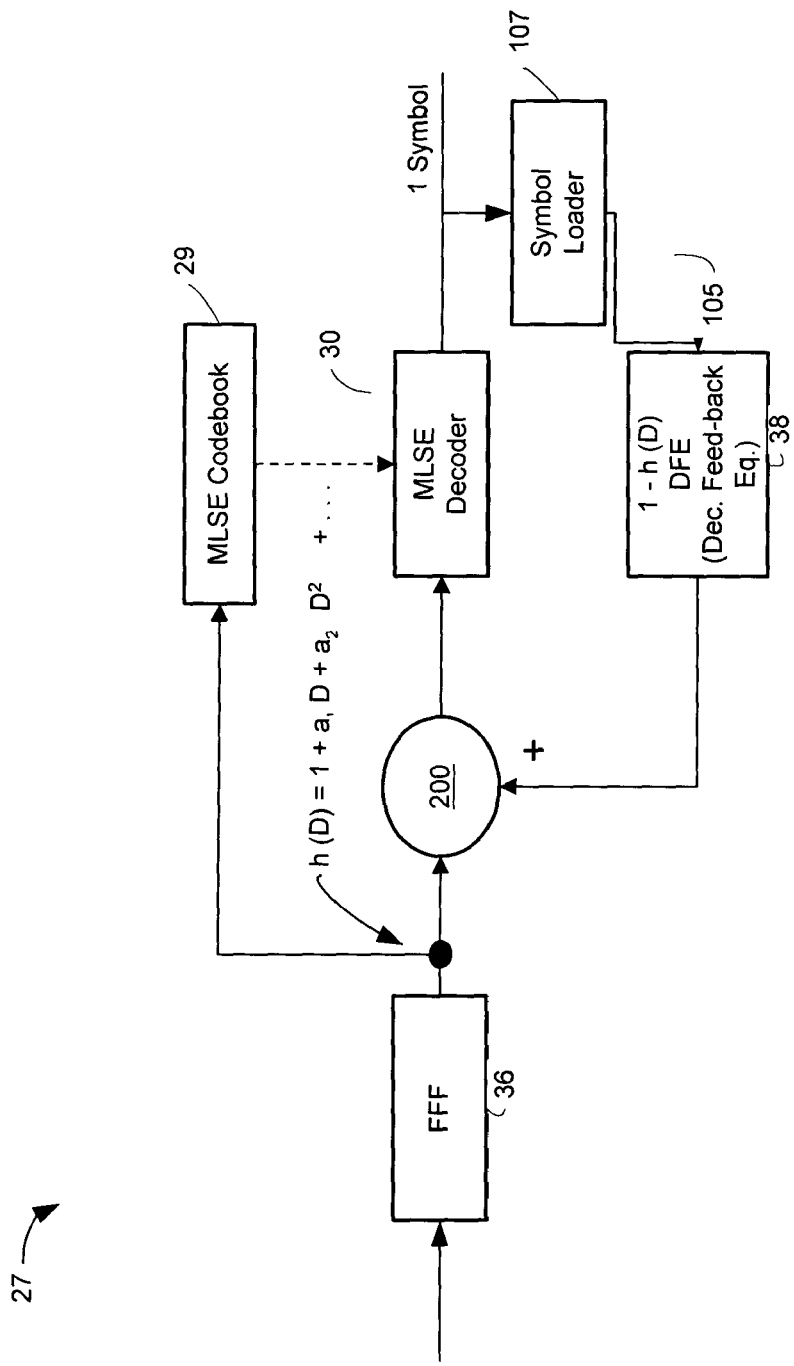
FIG. 3 shows a high level diagram of the equalizer device 28 coupled to the MSLE codebook 29.

There is a 1-symbol delay from the decoder device 30 back to the equalizer device 28. Subsequent to a determination made by the decoder device 30 as to which particular codeword was sent, the particular codeword is sent back to the device 28 to subtract the effect of the previous symbol on the in-coming symbol. This 1-symbol delay is shown as the symbol loader 107 in FIG. 3. In FIG. 3, the feedback circuit 38 is shown to perform the mathematical function '1−h (D)' where $h(D)=1+a_1D+a_2D^2+ \ldots h(D)$ is generated at the output of the feedforward circuit 36 and is referred to as the residual channel response. The terms $a_1D+a_2D^2+\ldots$ in h (D) represent the inter-chip interference (ICI) within the residual channel response h(D). The mathematical function '1−h (D)' is referred to as the feedback circuit output.

The residual channel response is used to build the MLSE codebook, stored within the location 29, and as shown in FIG. 3, the MLSE codebook is provided to the MLSE decoder device 30.

The output of the device 30 is provided to the input of a symbol loader 107, which illustrates the 1-symbol delay discussed hereinabove of the symbol generated by the decoder device 30. The 1-symbol delayed decoder output 105 is then provided to the input of the feedback circuit 38. A CCK codeword, decoded by the MLSE decoder 30, is included in the 1-symbol delayed decoder output as described hereinabove.

The effect of the previous symbol is subtracted at the summation junction 200. Even though, the summation appears to be adding, it is adding a '−h(D)', which in effect is the subtraction of the previous symbol. This aids in removing inter-symbol interference. FIG. 3 shows a very high level diagram of the equalizer device 28 (decision feedback equalizer) that will be explained in further detail hereinbelow.

In operation, after receiving the last chip of a symbol, a decoded symbol is loaded into the feedback circuit 38 by the symbol loader 107 at one time. When receiving other than the last chip zeroes are loaded in at least one chip of the CCK codeword in the 1-symbol delayed decoder output by the symbol loader 107. The operation of the feedback 38 removes the effect of the zeroes on the sub-receiver 27. In other words, outside of a symbol or for lengths longer than a symbol, the feedback 38 will take care of or remove or mitigate the effects of inter-chip interference but the decoder device 30 and the MLSE codebook mitigate the effects of inter-chip interference within a symbol.

Figure 4:
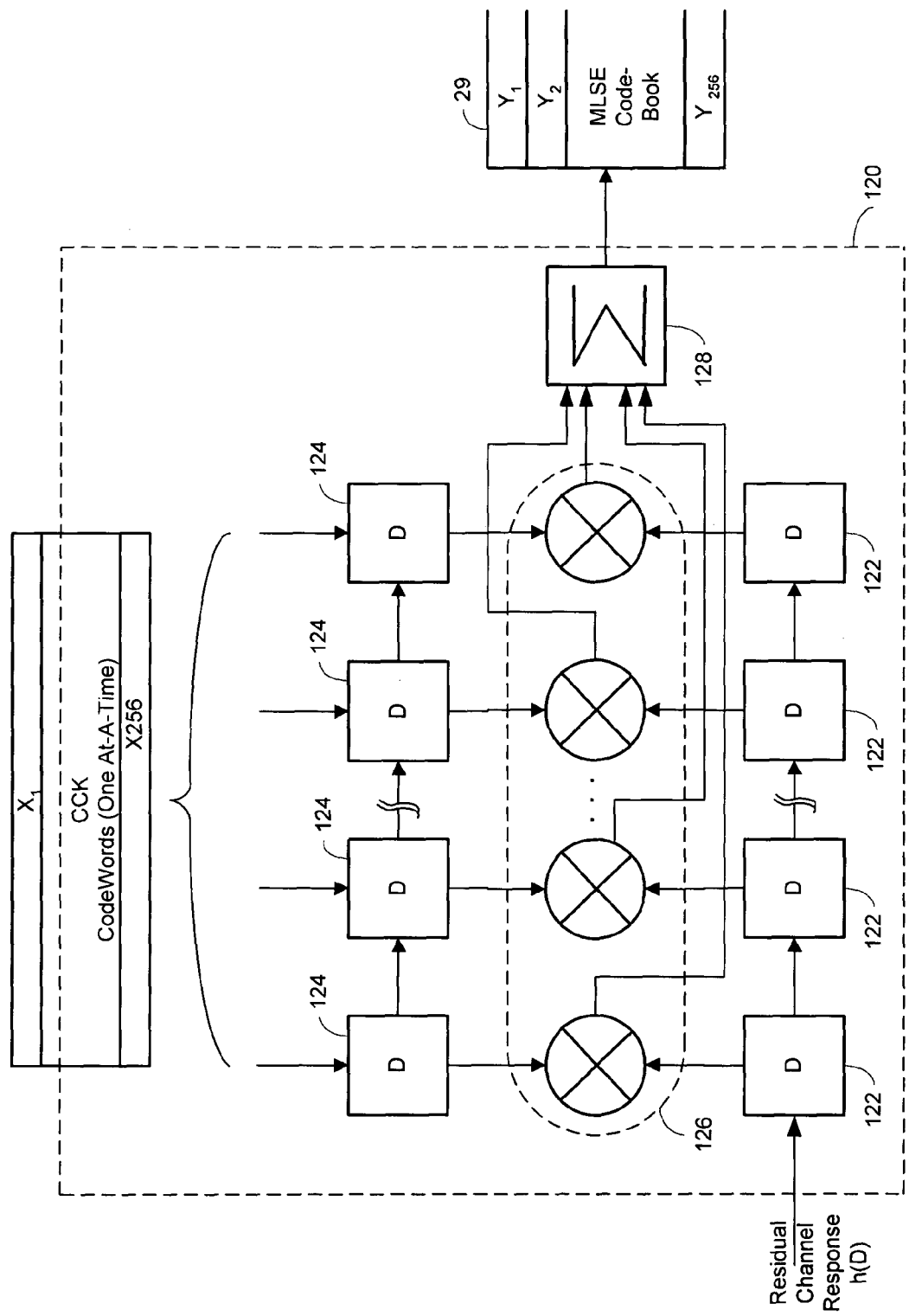
FIG. 4 shows a block diagram of a conventional convolution circuit 120 employed by an embodiment of the present invention for the construction or generation of MLSE codebook.

In FIG. 4, a convolution circuit 120 is shown in accordance with the performance of convolution of the residual channel response h(D), and known codewords, as defined in the IEEE document indicated hereinabove, in accordance with the data rate being employed. Such a convolution function is represented in mathematical form as Y=X*h(D). Y being the result of the convolution or that which is at 29, X representing the known CCK codewords being input to the delays 124 and * representing a convolution function. The output of the convolution function yields more than 8 terms, only the first eight of which are utilized with the remainder discarded. Thus, the output of the convolution function is truncated to eight as is then the codewords within the MLSE codebook storage location 29. The truncated terms are not needed because for ICI that is longer than one-symbol duration (8 chips in the case of CCK), the feedback circuit 38 will remove the ICI after a symbol is decoded and becomes a known value to the receiver.

In FIG. 4, an input, the residual channel response, is shifted into the delays 122, each delay being a unit of time delay and CCK codewords are input to the delays 124 with each delay being a unit of time. The CCK codewords are provided to the delays 124 one-at-a-time. The output of the delays 124 are multiplied by the shifted or delayed residual channel response using the multipliers 126. The output of each of the multipliers 126 is then added utilizing the summer 128. At the summer 128, eight chips are generated. Each time a codeword is multiplied and added with a delayed version of the residual channel response, an MLSE codebook is generated. For each 256 codewords, the residual channel response h(D) is delayed 8 times, or goes through 8 delays 122.

Every CCK codeword causes a MLSE codeword to be generated.

The codewords that are provided to the delays 124 are the ideal codewords for the 802.11b known in advance or predetermined. The codewords are stored in a storage location 29 shown in FIG. 2. That is, they are all of the possible symbols that the in-coming data can represent. The residual channel response is continuously shifted through the delays 122. In 11 Mbits/sec CCK, a total of 256 different MLSE codewords are generated to form a MLSE codebook and ultimately the decoded transmitted data is found by finding the minimum distance (or maximum likelihood) between the various codewords and the received equalized data, as will be obvious shortly.

The convolution circuit of FIG. 4 is a conventional convolution function that is convolving CCK codewords with the residual channel response to produce MLSE codebooks. Each 256 CCK codewords comprise a CCK codebook and each 256 MLSE codewords comprise an MLSE codebook. The MLSE sub-receiver 27 generates the MLSE codebook on-the-fly (i.e., in real-time).

In operation, when all of the codewords are passed through the equalizer device 28, the data can be accurately detected by a comparison to all of the different codewords and a determination as to which codeword matches the data. A detected match determines the correct identity of the data. This is perhaps best understood relative to FIG. 5.

Figure 5:
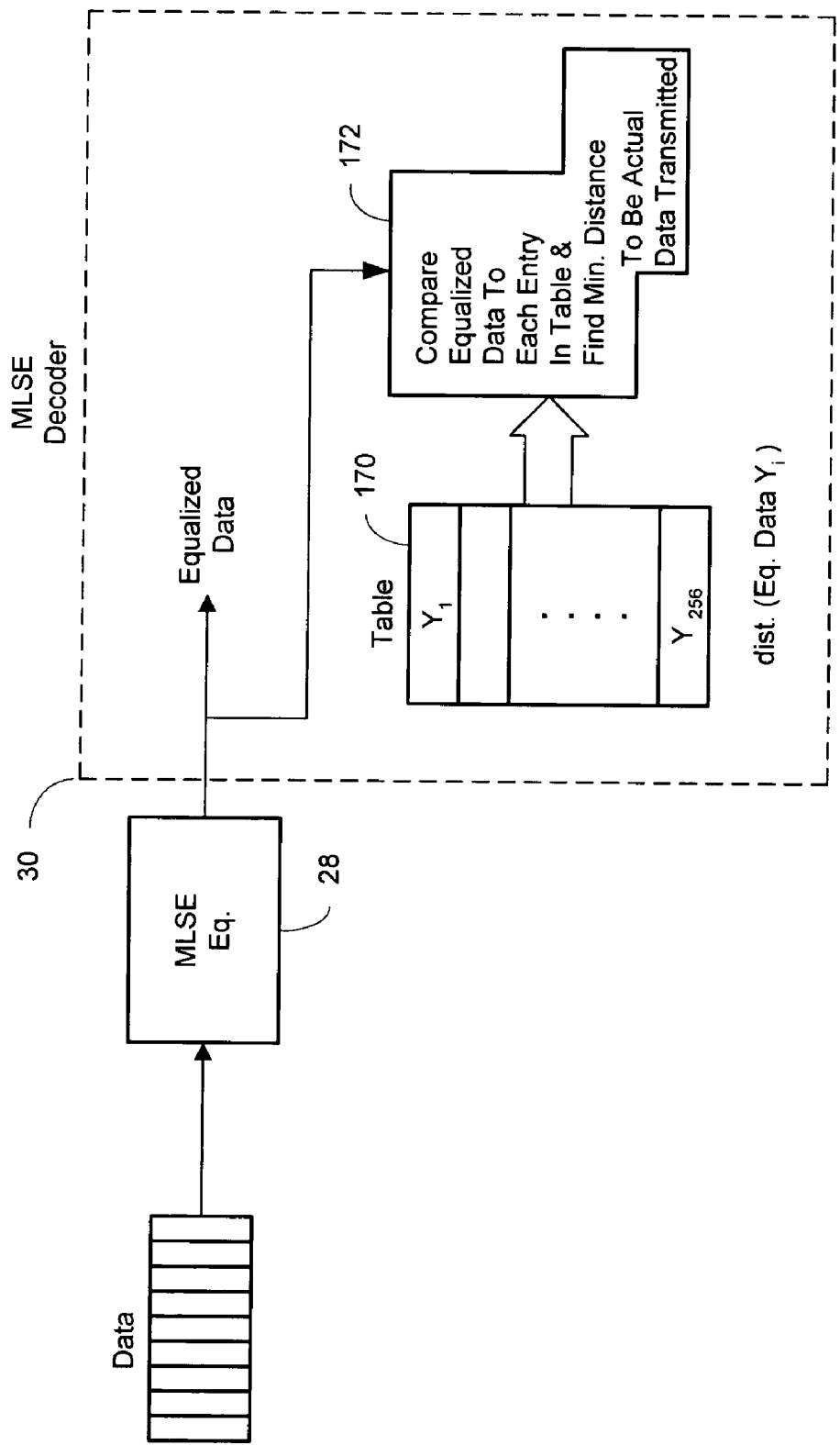
FIG. 5 illustrates further details of the decoder device 30 in accordance with an embodiment of the present invention.

In FIG. 5, the input data is shown as input to the equalizer device 28, which essentially mitigates the input data in some known manner to produce an equalized data. The latter is compared at 172 to 256 entries in a table 170. The input data received by the equalizer device 28 is in the form of samples of a packet of data. A determination is made as to which of the entries of table 170 closest resembles the equalized data. The entries of the table 170 comprise the MLSE codebook. In essence, 256 distances between the data being compared and the codewords is calculated and the minimum distance (distance (equalized data, $y_i$)) among all of the distances will be determined because then the data will be presumed to be that of the minimum-distance or maximum likelihood codeword found. The codeword found will have a particular index associated therewith and according to this index, the decoded transmitted data is determined by referring to the CCK codebook with the index to find the corresponding CCK codeword.

The comparison of 172 is not truly a comparison, rather, it is a calculation of the MSED between the equalized data and the codewords $y_i$ or dist (equalized data, $y_i$). Each of the $y_i$ is a symbol and if the equalized data was represented as $r_1, r_2 \ldots r_8$ for each symbol and for example the first codeword symbol $y_1$ in table 170 was represented as $y_{11}$, $y_{12}, \ldots y_{18}$, the Euclidean Distance (ED) for the first symbol would be $y_1 = \|(r_1-y_{11})\|^2 + \|(r_2-y_{12})\|^2 + \ldots + \|(r_8-y_{18})\|^2$ where $r_i$ and $y_{ij}$ are complex number and $\| \|$ is a normalization function such that $\|f(\ )\|^2$ is the square of the norm of $f(\ )$. Assume the result of this calculation to be $y_m$, the index m is used to select the corresponding CCK codeword from the CCK codebook and the decoded transmitted data is determined.

It should be noted that while in the embodiment of FIG. 5, MSED is used to determine the decoded transmitted data; maximum likelihood between the equalized data and the codewords in table 170 may be used in alternative embodiments. In yet other embodiments, any distance may be used.

A direct computation can show that the complexity of the MLSE decoder is 512 multiplications and 1024 additions for every chip. This number can easily dominate the complexity of the whole receiver system.

Figure 6:
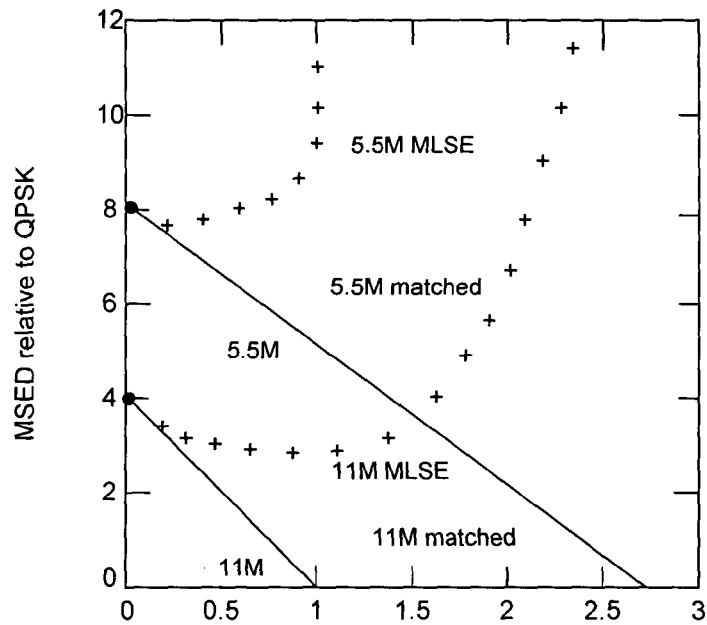
FIGS. 6 and 7 show graphs of the performance of a prior art system vs. the performance of an embodiment of the present invention.
Figure 7:
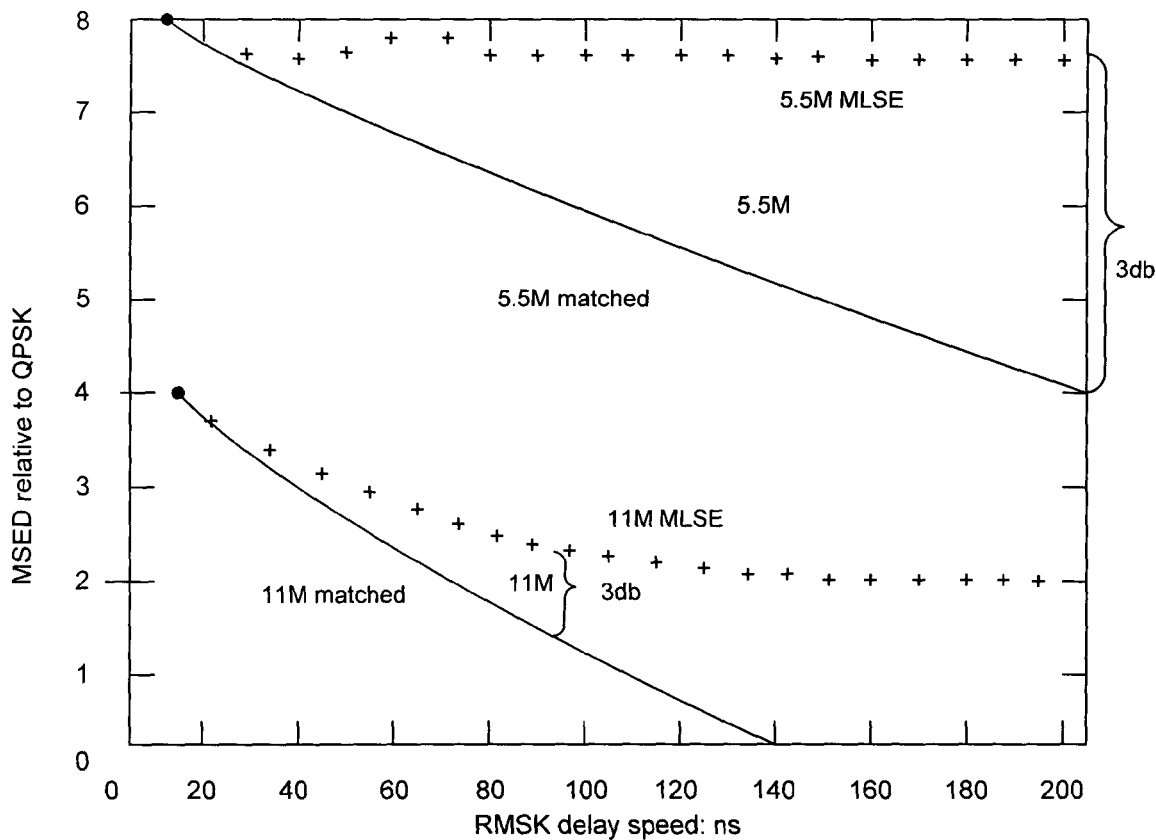

FIGS. 6 and 7 show graphs of the performance of an embodiment of the present invention with that of the prior art. The solid lines represent the performance of a prior art technique whereas the lines having plus or "+"s represent the performance of an embodiment of the present invention. There are two sets of lines for two different bit rates, 11 Mbits/sec and 5.5 Mbits/sec. The x-axis represents the values that 'a' can have, 'a' being for example, the coefficient that is multiplied by 'D' in the equation for $h(D)=1+a_1D$ relative to FIG. 3. As shown in FIG. 6, in the case of 11 Mbits/sec., when a=1, the prior art system introduces so much inter-symbol interference that use of the same will essentially yield inoperation of the wireless receiver in detecting data, whereas, the performance of the embodiment of the present invention shows a substantially better performance. At the point where the solid lines hit "0" of the y-axis, the prior art system is inoperable because there are two symbols that have the same distance and the data is not retrievable. An example of this problem is stated hereinabove with respect to factory or cubicle operations wherein multi-path communication channel effects degrade detection of data using prior art techniques and methods. In fact, in the present invention, neither inter-symbol interference nor multi-path communication channel interferes with the accuracy of the detection of the present invention. In the case of 5.5 Mbits/sec., when a is approximately 2.7, inter-symbol interference is intolerable, whereas, the embodiment of the present invention again exhibits much improved performance.

In FIG. 7, the performance of a prior art technique, shown by solid lines, is shown against an embodiment of the present invention, shown by "+"s. The y-axis represents the MSED relative to QPSK and the x-axis represents the root mean square delay speed. As shown in FIG. 7, in the case of 11 Mbits/sec. and at the point where the RMS delay speed (in nsec) is 80 nsec., there is a 3 db difference in performance between the prior art system and the embodiment of the present invention. When the RMS delay is 140 nsec., the prior art system becomes in operable whereas the embodiment of the present invention is operable with great detection capabilities, thus, there is immeasurable difference in performance. In the case of 5.5 Mbits/sec., when the RMS delay is 200 nsec., there is again a 3 db difference in performance. It should be noted that the graphs of FIGS. 6 and 7 are hypothetical in that they do not represent actual operation results, rather, they represent theoretical performance differences between a method of prior art and the present invention.

Thus, the present invention allows the maximum performance of the 802.11b to be utilized and optimizes performance by mitigating the effects of multi-path and/or inter-chip interference.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A maximum likelihood sequence estimator (MLSE) sub-receiver comprising:

an MLSE equalizer device responsive to input data for processing the input data to generate equalized data, said input data being generated from transmitted data being transmitted by wireless transmission, said MLSE equalizer device processing said input data to generate residual channel response, said MLSE equalizer device using a known codebook and said residual channel response to generate an MLSE codebook; and an MLSE decoder responsive to said equalized data and said MLSE codebook for processing the equalized data and said MLSE codebook to determine maximum likelihood between said equalized data and said MLSE codebook, said MLSE decoder using said maximum likelihood for decoding said equalized data to generate a decoded transmitted data by mitigating the effects of multi-path communication channel due to wireless transmission of said transmitted data.

2. An MLSE sub-receiver as recited in claim 1 wherein said transmitted data includes transmitted data packets, a sequence of said transmitted data packets constituting a complementary code keying (CCK) codeword, said CCK codeword including one or more chips, rate of transmission of said transmitted data determining a CCK codebook, said CCK codebook including one or more of said CCK codewords.

3. An MLSE sub-receiver as recited in claim 2 wherein said MLSE equalizer device includes a feedforward circuit and a feedback circuit, said feeedforward circuit generating said residual channel response.

4. An MLSE sub-receiver as recited in claim 3 wherein a symbol loader is responsive to output of said MLSE decoder for processing the same to generate a 1-symbol delayed decoder output, said 1-symbol delayed decoder output including said CCK codeword, said feedback circuit subtracting said residual channel response from said 1-symbol delayed decoder output to generate feedback circuit output.

5. An MLSE sub-receiver as recited in claim 4 wherein said feedback circuit output is added to said residual channel response to generate said equalized data, said feedback circuit output being added to said residual channel response to minimize inter-chip interference.

6. An MLSE sub-receiver as recited in claim 3 wherein said MLSE equalizer device convolves said CCK codeword with said residual channel response to generate an MLSE codeword.

7. An MLSE sub-receiver as recited in claim 6 wherein said CCK codebook for generating an MLSE codebook, said MLSE codebook including one or more of said MLSE codewords.

8. An MLSE sub-receiver as recited in claim 7 further including an MLSE codebook storage location for storing said MLSE codebook.

9. An MLSE sub-receiver as recited in claim 8 wherein said MLSE decoder compares said equalized data to said MLSE codebook for determining a maximum likelihood MLSE codeword having an index.

10. An MLSE sub-receiver as recited in claim 9 wherein said MLSE decoder for decoding said equalized data by using said index of said maximum likelihood MLSE codeword to identify a corresponding CCK codeword in said CCK codebook, said corresponding CCK codeword representing said decoded transmitted data.

11. An MLSE sub-receiver as recited in claim 9 wherein said maximum likelihood MLSE codeword in said MLSE codebook having a minimum square Euclidean distance (MSED) to said equalized data.

12. An MLSE sub-receiver as recited in claim 7 wherein said feedforward circuit is a feedforward fractionally spaced filter (FFF) circuit and said feedback circuit is a decision feedback equalizer (DFE) circuit.

13. An MLSE sub-receiver as recited in claim 8 wherein said MLSE codebook storage location being used for storing said CCK codebook.

14. An MLSE sub-receiver as recited in claim 4 wherein said symbol loader loading zeroes in at least one said chip of said CCK codeword in said 1-symbol delayed decoder output to mitigate the effects of inter-chip interference.

15. An MLSE sub-receiver as recited in claim 1 for reducing the effects of inter-symbol interference and multi-path communication channel arising in factory and cubicle operations.

16. An MLSE sub-receiver as recited in claim 7 wherein said MLSE equalizer device for generating said MLSE codebook on-the-fly.

17. A method for generating decoded transmitted data in a maximum likehood sequence estimator (MLS) subreceiver comprising:

receiving input data and processing the input data to generate equalized data;

processing the input data to generate residual channel data;

using a known codebook and the residual channel data to generate an MLSE codebook;

processing the equalized data and the MLSE codebook to determine maximum likelihood therebetween; and using the maximum likelihood between the MLSE codebook and the equalized data for decoding the equalized data to generate the decoded transmitted data thereby mitigating inter-chip interference effect.

* * * * *